S. F. ARBUCKLE.
AUTOMOBILE HEADLIGHT APPARATUS.
APPLICATION FILED SEPT. 15, 1919.

1,397,393.

Patented Nov. 15, 1921.
2 SHEETS—SHEET 1.

INVENTOR.
SAMUEL F. ARBUCKLE.
BY
Lockwood Lockwood
ATTORNEYS

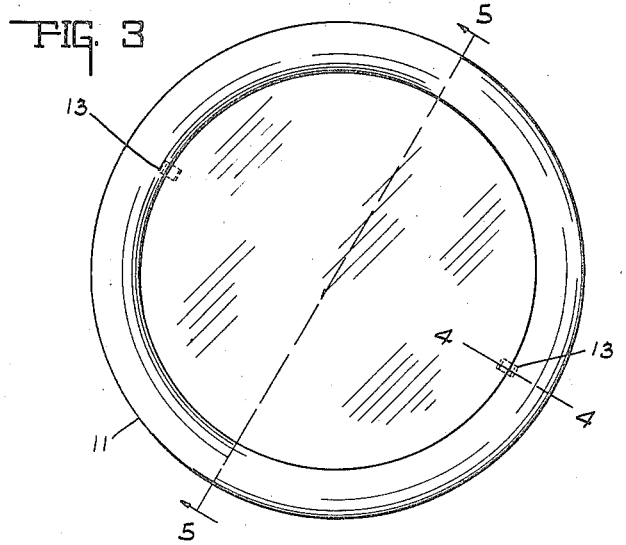
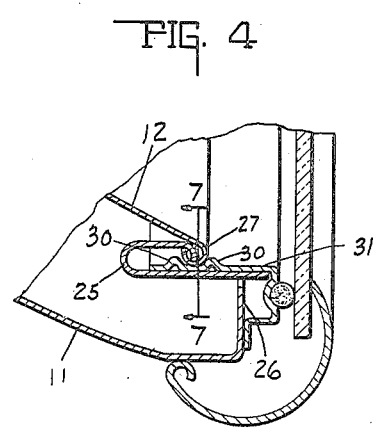
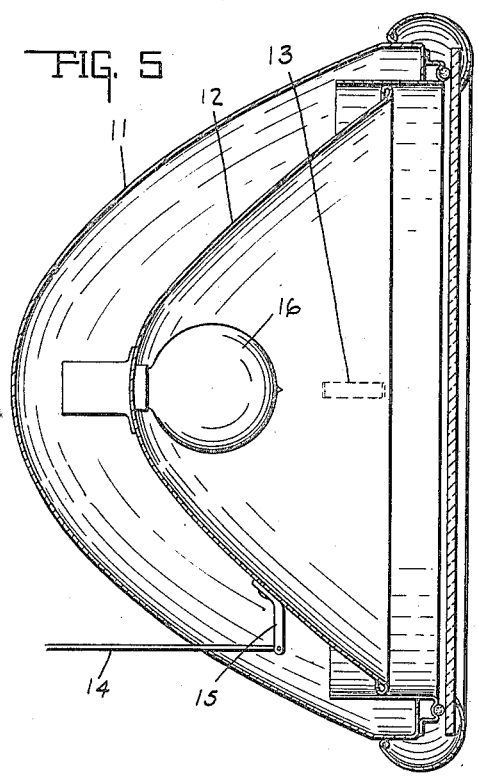
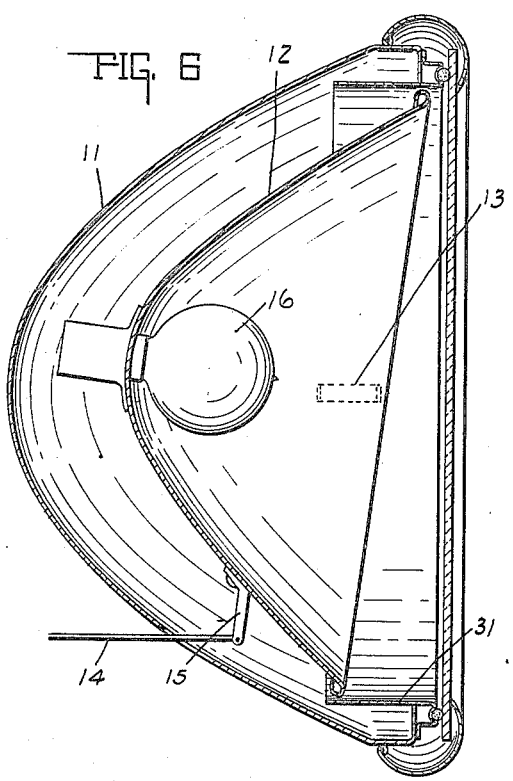
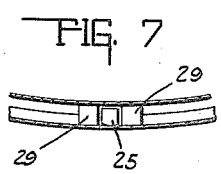

UNITED STATES PATENT OFFICE.

SAMUEL F. ARBUCKLE, OF INDIANAPOLIS, INDIANA, ASSIGNOR TO UNITED STATES AUTOMOTIVE CORPORATION, OF CONNERSVILLE, INDIANA, A CORPORATION OF DELAWARE.

AUTOMOBILE-HEADLIGHT APPARATUS.

1,397,393.                 Specification of Letters Patent.       Patented Nov. 15, 1921.

Application filed September 15, 1919. Serial No. 323,774.

*To all whom it may concern:*

Be it known that I, SAMUEL F. ARBUCKLE, a citizen of the United States, and a resident of Indianapolis, county of Marion, and State of Indiana, have invented a certain new and useful Automobile-Headlight Apparatus; and I do hereby declare that the following is a full, clear, and exact description thereof, reference being had to the accompanying drawings, in which like numerals refer to like parts.

The object of this invention is to improve the headlight apparatus for automobiles so as to conform to the various ordinances and laws of the cities and States in the United States, and to enable the driver of an automobile to have proper lighting of the highway at the proper distance in front of him when any one is approaching, and to change the lighting when any one approaches so that the left-hand lamp will illuminate the roadway 50 or 60 feet in front of the automobile carrying the lamp, and the right-hand lamp will illuminate the right-hand side of the roadway and thus enable the driver to safely travel past by another automobile and not throw any light in the face of the driver of that automobile.

The chief feature of this invention is the construction which enables said important results to be accomplished. The reflector of each of the headlight lamps is oscillatably mounted obliquely so that an oscillation of the reflector in one of said lamps, from the normal straight forward position, causes the stream of light to be thrown downwardly and to the right-hand simultaneously.

The full nature of this invention will be more fully understood from the accompanying drawings and the following description and claim.

Figure 1:
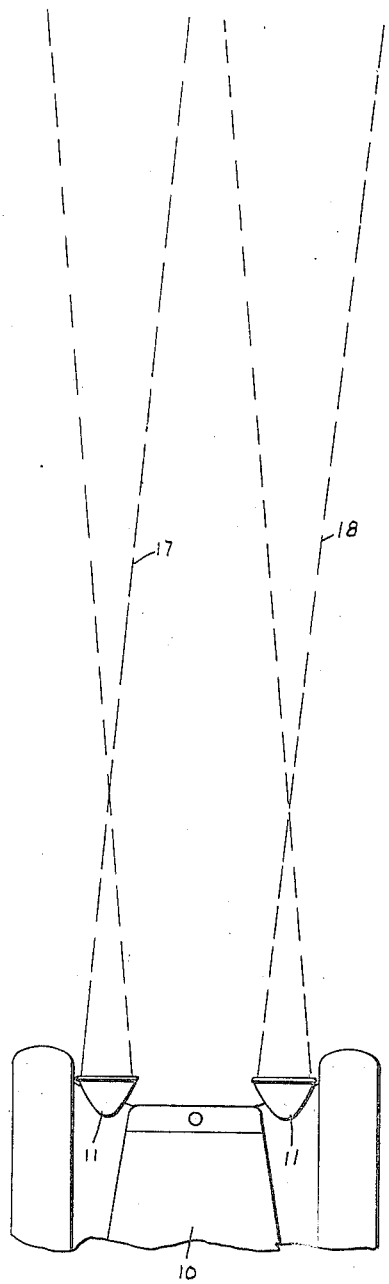
Figure 2:
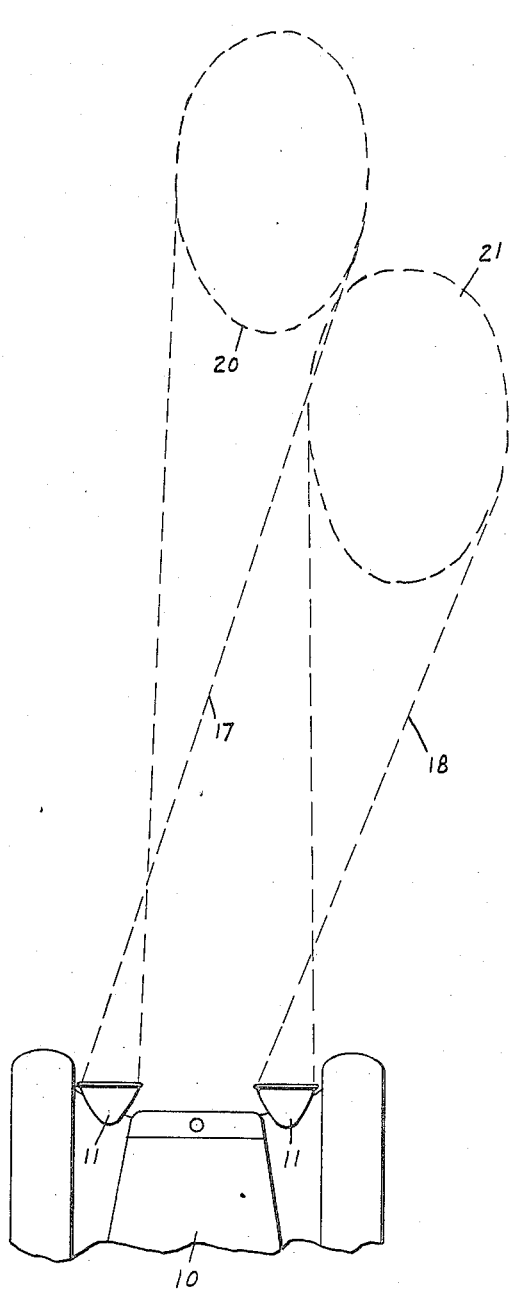

In the drawings Figure 1 is a plan view of the forward part of an automobile equipped with a pair of lamps in which the reflectors are in their normal position and the stream of light from each of them is directed by the reflector straight forward for use in ordinary driving. Fig. 2 is the same with the reflectors oscillated or moved from their normal positions, which causes the streams of light to be thrown downwardly and to the right as indicated by dotted lines therein. Fig. 3 is a front elevation of one of said lamps with the pivotal mounting of the reflector shown by dotted lines. Fig. 4 is a section on the line 4—4 of Fig. 3, but on a larger scale. Fig. 5 is a section through the lamp on the line 5—5 of Fig. 1, while the reflector is in its normal straight forward position. Fig. 6 is the same showing the reflector actuated so as to cast the stream of light downward and to the right. Fig. 7 is a section on the line 7—7 of Fig. 4.

There is shown herein the front part of an automobile having a pair of headlight lamp casings 11 rigidly mounted thereon in any suitable way, and said lamps are not oscillatable or movable during the operation of the automobile, but of course can be removed or replaced by hand.

Within the rigidly mounted lamp casings 11 there is a reflector 12 mounted obliquely at points 13, as seen in Fig. 3, so that when the reflector is actuated or tilted by any suitable means, such as a rod 14 and arm 15, it will throw the stream of light from the electric bulb or lamp 16 downward and to the right, as indicated by the dotted lines 17 and 18 in Fig. 2, so as to illuminate the roadway at 20 in front of the automobile and the right-hand side of the roadway at 21, when desired while approaching and passing another automobile.

The means or manner of pivotally mounting the reflector, as set forth herein, in order to cause the operation desired consists of a narrow hinge plate 25 secured to the metal band 31 lying within the inturned flange 26 of the casing 11 and extending inwardly and then curved toward the reflector 12 and then outward with its extreme end curved toward the body of said plate as shown in Fig. 4 so as to form what is substantially a hook-shaped plate. The extreme end of said hook projects into the outwardly turned bead 27 on the front edge of the reflector, and on each side of said hinged plate 25 there is a block 29, as seen in Fig. 7, secured to the reflector so as to prevent any lateral movement of the reflector in relation to the hinge plate 25. The bead 27 of the reflector is located between two ribs 30 formed on the metal band 31 which surrounds the forward edge of the reflector.

The hinges 13 are located diametrically opposite each other, as shown in Fig. 3. One of them is below a horizontal section through the lamp and the other is above the same so as to put them in an oblique position. In the drawings the hinges 13 are about thirty degrees from a horizontal section through the lamp, but the obliquity may be somewhat more or less than shown.

The reflector in its normal position is as shown in Fig. 1 and directs the stream of light forward in a substantially straight line. When meeting an approaching automobile, the reflectors are tilted to the position shown in Fig. 6 by drawing inward the lower ends thereof. The arm 15 is located about midway between the two hinges 13 and it, therefore, draws the lower part of the reflector inward and forces the upper part of the reflector outward somewhat. This directs the stream of light both downward and to the right as shown in Fig. 2. The left-hand reflector when thus operated is used to illuminate the roadway in front of the automobile and, therefore, it is oscillated to such position as to accomplish that result. The reflector, when thus turned, does not throw any light in the face of the driver of an approaching automobile, as it does not throw any appreciable light to the left of the car on which it is mounted, nor does it throw it high enough to cause a glare upon the driver of an approaching automobile. The illuminated portion 20 not only enables the automobile on which the lamp is located to be safely driven, but it indicates to the driver of the approaching automobile the portion of the road which he should pass by and not travel upon in order to avoid collision. One of the grave dangers in passing an automobile is due to the unreliability of the construction of the side of the roadway, which often causes the automobile to be upset. The right-hand reflector when tilted throws its stream of light downward to the right-hand side of the roadway so as to illuminate that portion of the roadway and avoid any disaster. It gives the driver a feeling of safety as compared with the lighting systems heretofore used, which, although the headlights could be turned downward, failed to illuminate the dangerous right-hand side of the roadway.

The invention claimed is:

A headlight including a stationary lamp casing, a metal band secured in the front part of said lamp casing and having a pair of ribs at diametrically opposite points, one pair of ribs being below and the other pair above the central horizontal plane through the lamp casing, a reflector having an outwardly turned beaded edge, a hooked-shape hinge plate secured to said metal band on the outer surface near each pair of said ribs and turned inward and extending into the bead of the reflector between said ribs, means secured to the reflector on each side of said hooked-shape plate for preventing any displacements of the reflector, and means for tilting the reflector substantially as set forth.

In witness whereof, I have hereunto affixed my signature.

SAMUEL F. ARBUCKLE.